July 31, 1956 J. A. DUVOISIN ET AL 2,757,234

TELEVISION SHUTTER

Filed March 29, 1950

Inventor

JEAN A. DUVOISIN

By ARTHUR F. HAYEK

Attorney

United States Patent Office 2,757,234
Patented July 31, 1956

2,757,234

TELEVISION SHUTTER

Jean A. Duvoisin, Briarcliff Manor, and Arthur F. Hayek, Pleasantville, N. Y., assignors to General Precision Laboratory Incorporated, a corporation of New York Application March 29, 1950, Serial No. 152,547

2 Claims. (Cl. 178—7.2)

This invention pertains to a television light source and shutter and more specifically to a light source and shutter for use in translating motion picture images to television signals.

The conventional motion picture projector contains an intermittent mechanism which periodically advances the film frame and a revolving shutter which interrupts the light at least during the time the film is advanced so that only successive stationary images are projected on an appropriate screen. Such shutters, however, cannot be used when the photographic images of the film strip are to be converted to television signals since the standard motion picture frame frequency differs from the standard television field frequency, motion pictures being projected at a rate of 24 frames per second while television images are transmitted at a rate of 60 television fields per second. Likewise those television translating tubes which are in the greatest general use permit of illumination thereof only during the periods of time which are extremely short compared to the periods of time of illumination obtained by the use of a conventional shutter.

One of the common methods of reconciling the difference in frequency between standard motion picture projection and television transmission is to utilize a special intermittent mechanism which advances the film after alternately long and short intervals of time these intervals being in the proportion of 3 to 2. Thus during the longer interval one frame of the motion picture is scanned three times by the television translating tube while during the shorter interval of time the next succeeding motion picture frame is scanned but twice. One such intermittent mechanism for performing this function is disclosed in the copending application of Arthur F. Hayek, Serial No. 103,571, filed July 8, 1949.

The television translating tube ordinarily used for purposes such as this is provided with a mosaic or photosensitive screen on which the picture image derived from the motion picture frame is focused. The light image so projected is converted to discrete electrical charges which in turn are converted to a suitable signal by scanning the mosaic by a cathode ray beam which scans the mosaic in a succession of horizontal lines progressing from top to bottom and which then returns or flies back to its initial position to begin a new scan. The usual television translating tube used for this purpose permits illumination only during the period of cathode ray return or fly-back time if uniformly illuminated television images are to be produced. This period of time is standardized at from 5% to 8% of the $\frac{1}{60}$ second field period and the gross illumination time must therefore be restricted to 833 microseconds.

In the past it has been proposed to use standard motion picture projection equipment altering only the intermittent as heretofore indicated, and the shutter to provide a member which would interrupt the light transmitted to the television translating tube for all except those extremely brief periods of time during which the cathode ray beam returns to the initial point of scan. Such alteration, however, results in the use of relatively massive parts revolving at high speed, limiting the use of such equipment.

One of the purposes of the present invention is to so redesign and relocate the elements which go to make up a projector that the moving parts may be of minimum weight and size thus producing light and simple equipment. In essence the instant invention places the shuttering device as close to the light source as possible so that this rapidly moving element may be greatly reduced in size over that necessary when such an element is located in its usual position adjacent the film gate or aperture.

The invention itself is capable of embodiment in various physical forms and may take the form of a concentrated light source such as a planar filament incandescent lamp having a revolving mirror positioned closely adjacent thereto. Again the shutter element may be composed of a disc having one or more apertures of suitable shape and size, the disc being positioned immediately adjacent the light source.

In still another embodiment a combination light reflector and shutter may be used to advantage, the shutter taking the form of a cylinder having a single aperture therein of suitable size with a reflector affixed to the inner wall of the shutter at a position diametrically opposite the aperture and the whole structure caused to revolve around a light source placed internally thereof.

Still further, the invention may take the form of a combined light source, reflector, mask and lens all of which is caused to revolve as a unit so as to periodically and at the appropriate intervals of time sweep the film aperture with a light beam.

A further understanding of this invention is had by reference to the detailed description and drawings, in which:

Figure 1 illustrates a light source and revolving plane mirror shutter.

Figure 2 schematically depicts a light source and disc shutter combination.

Figure 1:
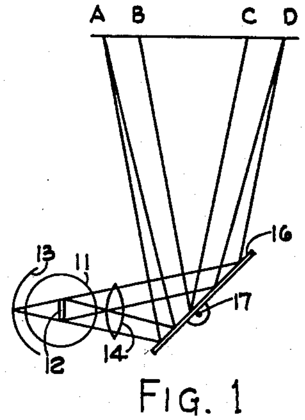

Referring to Fig. 1 a projector lamp 11 containing a planar filament 12 constitutes the desired light source and the light produced thereby is reinforced by a suitable light reflector 13. A lens system diagrammatically illustrated by the single lens 14 concentrates and projects the light in the direction of a mirror 16 provided with a single reflecting surface and caused to revolve in any suitable manner about an axis 17. As the mirror revolves the light from the source 12 impinging thereon and reflected therefrom is caused to sweep an arcuate path which includes the plane AD. It is in this plane that the projection aperture and film is positioned and the distance BC is chosen to represent the diameter of the film aperture, that is the diameter of a circular beam which circumscribes the usual rectangular film aperture. Thus supposing the apparatus designed for use with 35 mm. film the aperture diameter is equal to the diagonal of a motion picture frame or approximately $1\frac{5}{16}$ inch. Considering then that the film strip is positioned in and periodically advances through the plane BC, the light reflected from the revolving mirror is caused to periodically sweep the film aperture and film strip and the image of the film frame may be periodically projected thereby on a suitable television translator tube (not shown). It is understood of course that the plane AD is located near but not at the focal point of the lens system 14 conjugate to the location of the filament 12 as is conventional in projector practice so that a uniformly bright but not sharp image of the filament 12 is present in the plane.

The small size of the interrupted beam permits the rotating parts to be made small and light, and the high degree of utilization of light permits favorable comparison with the standard 35 mm. projector employing an arc lamp and used for ordinary theatre projection. As a result, it is possible to provide by the means of this invention more than enough light for optimum operation of the television pick-up tube.

The work involved in rotating the mirror 16 at 3600 R. P. M. is so small as to be of a different order of magnitude from the work involved in rotating the large and heavy discs formerly employed in transmitting television shutters, being less than 1/500 as much.

Figure 2:
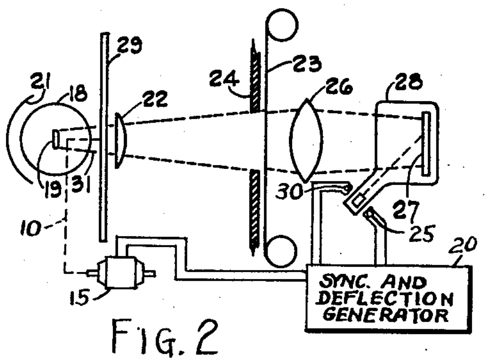

Another embodiment of the invention is illustrated in Fig. 2. A filament projection lamp 18 having a planar filament 19 is provided with a reflector 21, and is positioned so that an image of its filament is focused by a lens 22 approximately on a motion picture film 23, which is advanced in a suitable manner past a film aperture 24. The illuminated image of the film is focused by a lens 26 so that this image falls on the mosaic screen 27 of a television pick-up tube 28.

Figure 3:
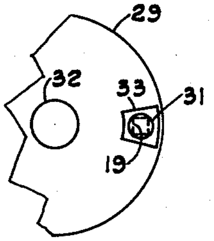
Figure 3 is a side view of a portion of the disc shutter of Fig. 2.

In order to restrict the times of illumination to vertical fly-back times, a disc 29 shown in edge view in Fig. 2 and plane view in Fig. 3 is interposed between the lamp 18 and the lens 22. This disc is provided with a single aperture 33 near its periphery and is rotated, so that when the aperture is in line with the light beam 31 the film aperture is illuminated, while at all other times the light beam is cut off. Since the disc 29 is positioned very close to the lamp 18, the beam 31 is small and the aperture in the disc can be small, with the result that the disc radius can be small.

The relative sizes of the filament, light beam and aperture are more clearly illustrated in Fig. 3, in which a face of the disc 29 is shown together with the position of the lamp filament 19. The light beam 31 at the disc is considered to be circular and of the size of a circle circumscribing the filament 19. If a speed of 3600 R. P. M. be chosen for revolving the disc 29 about its center 32, any point thereon will travel 18° in 5% of 1/60 second. If now a radius be chosen for the disc, the circle circumscribing the filament having a diameter of approximately 1/2 inch will subtend a known angle at the center of the disc. The difference between this angle and 18° is, of course, the maximum permissible aperture or opening in the disc. The aperture 33 is illustrated as having two sides formed by radii drawn to the center of the disc with the remaining sides formed by arcs concentric with the disc. The opening may, of course, have any other desired shape, but it is desirable to have the ratio between average illumination and maximum illumination on the film aperture during shutter openings as high as possible.

Figure 4:
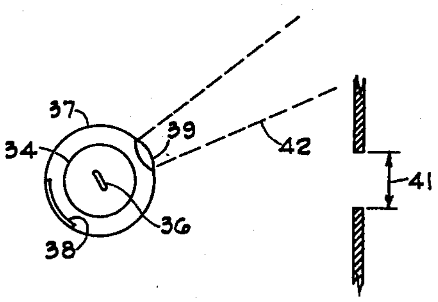
Figure 4 depicts a rotatable light source serving as combined source and shutter.

A third embodiment is illustrated in Fig. 4. A projection lamp 34 having a filament 36 is enclosed in a mask 37. The mask has a reflector 38 interiorly thereof at one side of the filament 36 and a lens 39 positioned diametrically opposite thereto. The lamp together with its mask, reflector, and lens is rotated about a longitudinal axis through the center of the lamp filament. The aperture 41 at which the motion picture film is positioned is located at an appropriate distance from the lamp so that reasonable efficiency may be secured in illumination of the aperture.

The rotation of the lamp filament 36 produces centrifugal force thereon, which makes advisable a design of filament which will withstand the force.

It is evident that the lens 39 may be made fixed and stationary while the lamp, reflector and mask rotate, with approximately the same effect as that described. In fact, the rotation of the mask 37 alone will produce the desired result.

Figure 5:
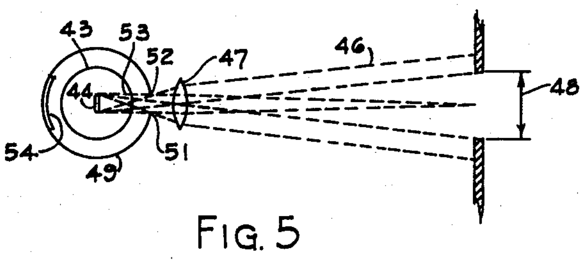
Figure 5 depicts a stationary light source and rotating cylindrical shutter.

Fig. 5 illustrates such a device. A lamp 43 having a filament 44 is placed so as to transmit a light beam 46 through a lens 47 toward a motion picture film aperture 48. A cylindrical mask 49 having an opening represented by the edges 51 and 52 is arranged to rotate about its longitudinal axis in the lamp filament 44. This mask 49 may carry a reflector 54 positioned diametrically opposite the opening 51—52, or the mask may be specular over its entire inner surface with equal effect. When the mask is made to rotate at 3600 R. P. M. it will rotate 18° during 5% of 1/60 second. The angle, then, that the diameter of the beam 46 at the film aperture subtends at the center of the filament must be not over 18°, and this fact together with the optical design, determines the angular size of the opening 51—52 in the mask.

Any conventional means may be utilized to maintain the proper synchronism and phase relation between the light interrupting means of the various embodiments disclosed herein and the scanning of the television pick-up tube screen to insure that the pick-up tube screen is illuminated only during the fly-back or vertical retrace time. For example, as illustrated in connection with Fig. 2, the synchronizing and deflection generator 20 which supplies the usual deflection potentials to the deflection systems of the tube as indicated by the deflection coils 25 and 30 may also constitute a source of energy for the synchronous motor 15 which acts to rotate the light interrupting element through the medium of the shaft 10.

Any of the rotating members in the various embodiments may be arranged to cause illumination of the aperture more than once per revolution, but in the absence of special reasons for such an arrangement a single illumination per revolution is preferred because it has the highest illumination efficiency in the sense heretofore defined.

What is claimed is:

1. In a device for translating motion picture images to television signals, an incandescent light source, a projection aperture, a film strip, means for advancing said film strip past said aperture, a television translating tube having a photosensitive screen so positioned with respect to said light source and said film strip that light images corresponding to the photographic images on said film strip are projected on said photosensitive screen, a light interrupting means comprising a revolving opaque cylinder provided with a single aperture in the periphery thereof surrounding and positioned concentrically with said light source with the periphery thereof located between said light source and said film strip, said light interrupting means having at least a portion of the internal surface of said cylinder diametrically opposed to the aperture therein made light reflecting, said light interrupting means preventing light from being projected through said film strip and onto said photosensitive screen at all times except during the intervals of vertical retrace of said television translating tube.

2. In a device for translating motion picture images to television signals, an incandescent light source, a projection aperture, a film strip, means for advancing said film strip past said aperture, a television translating tube having a photosensitive screen so positioned with respect to said light source and said film strip that light images corresponding to the photographic images on said film strip are projected on said photosensitive screen, a light interrupting means comprising a revolving opaque drum having a single aperture in the periphery thereof, said light source being mounted interiorly of said drum and said drum having its periphery located between said light source and said film strip, said drum having at least that portion of its internal surface which is diametrically opposed to the light transmitting aperture therein made light reflecting, said drum preventing light from being projected through said film strip and onto said photosensitive screen at all times except during the intervals of vertical retrace of said television translating tube.

(References on following page)

References Cited in the file of this patent

UNITED STATES PATENTS

| | | |
|---|---|---|
| 1,786,812 | Zworykin | Dec. 30, 1930 |
| 1,957,101 | Donle | May 1, 1934 |
| 2,022,505 | Hartley | Nov. 26, 1935 |
| 2,122,974 | Browne | July 5, 1938 |

| | | |
|---|---|---|
| 2,202,795 | Harding | May 28, 1940 |
| 2,303,960 | Seeley | Dec. 1, 1942 |
| 2,483,149 | Norgaard | Sept. 27, 1949 |

FOREIGN PATENTS

| | | |
|---|---|---|
| 555,773 | Great Britain | Sept. 7, 1943 |